Jan. 13, 1970     C. A. RICHINS     3,489,131
COLLAPSIBLE CAMP STOVE
Filed April 19, 1968     4 Sheets-Sheet 1
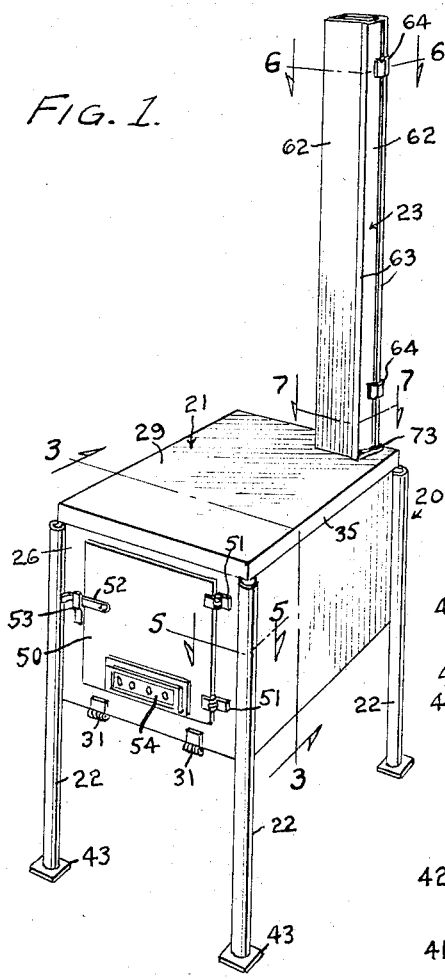
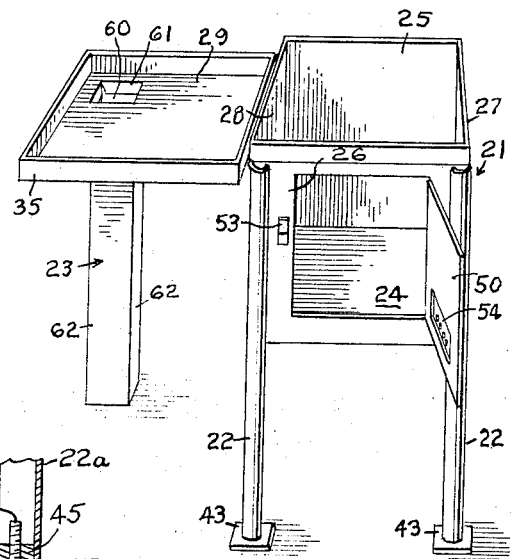
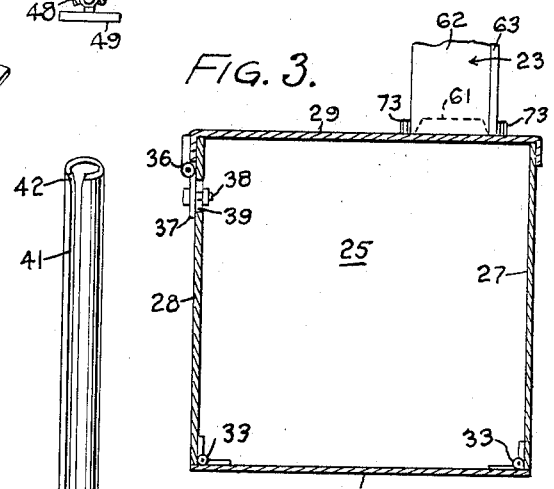
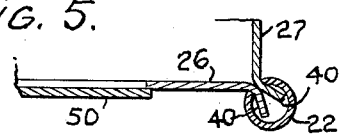
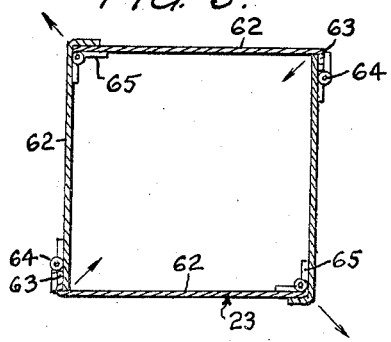
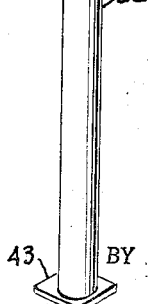
INVENTOR
Charles A. Richins
BY Alexander B. Blair
ATTORNEY Jan. 13, 1970  C. A. RICHINS  3,489,131
COLLAPSIBLE CAMP STOVE
Filed April 19, 1968  4 Sheets-Sheet 2
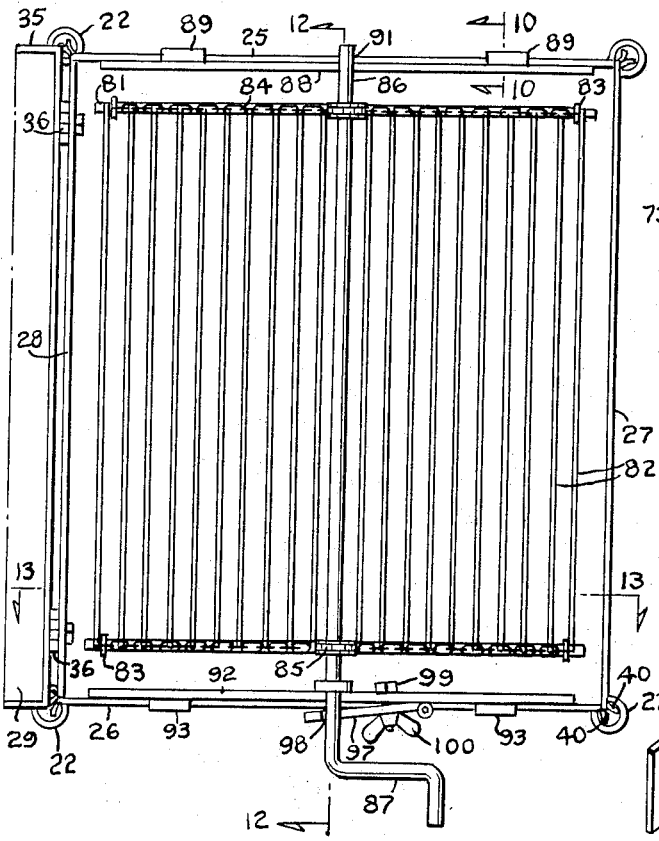
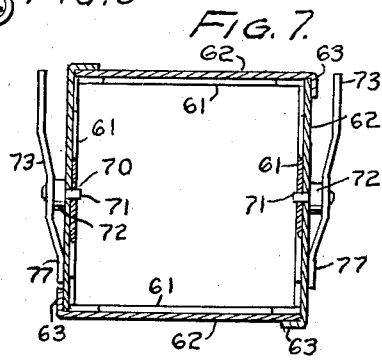
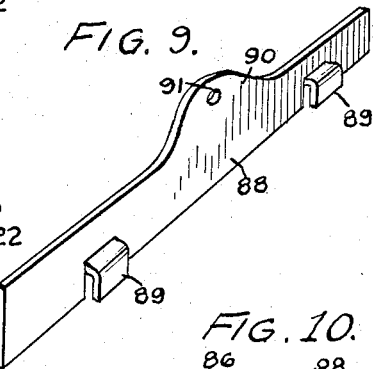
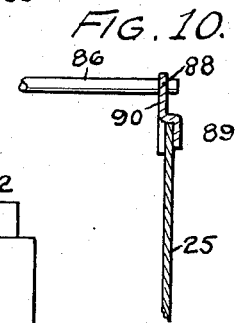
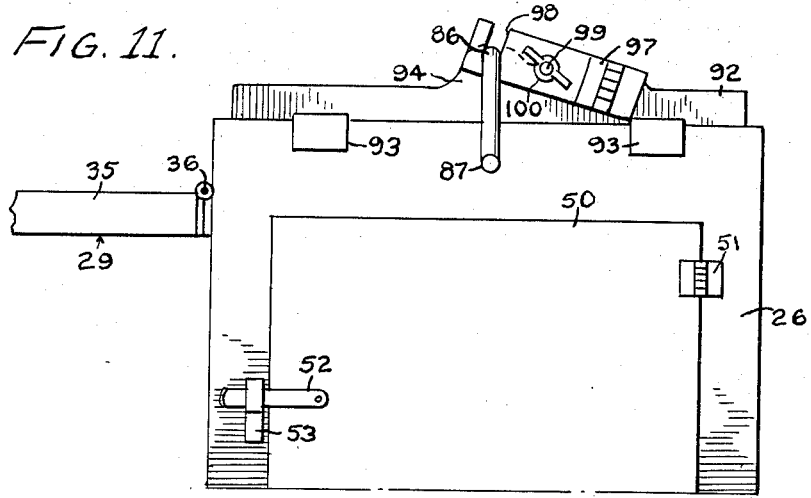
INVENTOR
*Charles A. Richins*
BY *Alexander B. Blair*
ATTORNEY Jan. 13, 1970 C. A. RICHINS 3,489,131
COLLAPSIBLE CAMP STOVE
Filed April 19, 1968 4 Sheets-Sheet 3
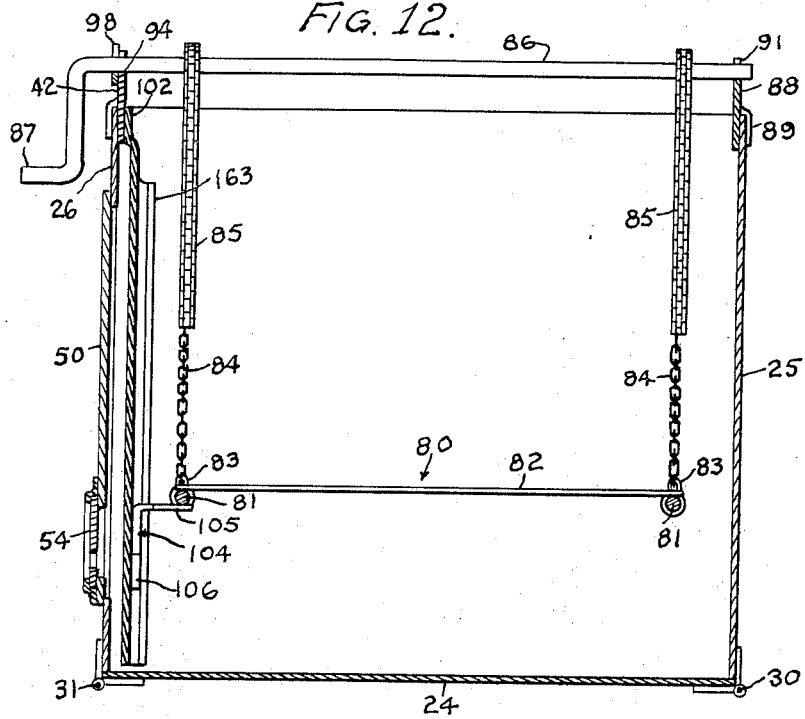
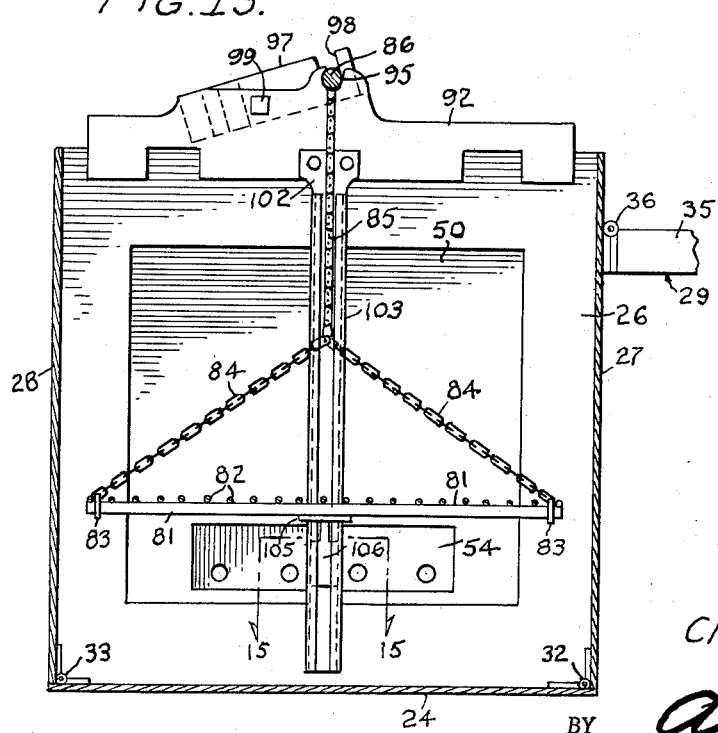
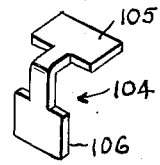
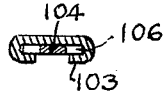
INVENTOR
Charles A. Richins
BY Alexander B. Blair
ATTORNEY Jan. 13, 1970  C. A. RICHINS  3,489,131
COLLAPSIBLE CAMP STOVE Filed April 19, 1968  4 Sheets-Sheet 4

INVENTOR
Charles A. Richins

BY Alexander B. Blair
ATTORNEY

United States Patent Office 3,489,131
Patented Jan. 13, 1970

3,489,131
COLLAPSIBLE CAMP STOVE
Charles A. Richins, 8104 Peerless Ave.,
Orangevale, Calif. 95622
Filed Apr. 19, 1968, Ser. No. 722,678
Int. Cl. F24c 1/16, 9/00; A47i 37/07
U.S. Cl. 126—9                                    23 Claims

ABSTRACT OF THE DISCLOSURE

A collapsible camp stove having a body consisting of a bottom having side and end walls hinged thereto and a top hinged to one of the side walls forming a box-like firebox when assembled, and folding into a substantially flat package when disassembled, flanges on the abutting ends of the side and end walls, and slotted legs fitting over the flanges to support and hold the body in assembled relation, a collapsible chimney detachably mounted on the cover, and a removably mounted grate adjustably supported interiorly of the fire box when the lid is open.

---

This invention relates to a collapsible camp stove and has as its primary object the provision of a stove which may be employed in any out-of-doors location, and which, when not in use, may be folded into a compact, relatively flat package to facilitate transportation and storage.

A further object of the invention is the provision of a stove of this character having a flat top cooking surface, with a foldable chimney mounted adjacent one corner thereof, so arranged that when the top is opened the chimney will serve as a support therefor.

A further object of the invention residues in the provision of a detachable grill mounting means which may be secured to the end walls of a fire box for supporting a grill interiorly thereof, and means for varying the relative height of the grill and maintaining the same in the desired position of adjustment.

A further object of the invention resides in the provision of a stove of this character which is sturdy and durable in construction, reliable and efficient in operation, readily and easily disassembled, and adaptable to storage or transportation in a relatively flat compact condition.

Still other objects will in part be obvious, and in part be pointed out as the description of the invention proceeds and shown in the accompanying drawings wherein there is disclosed a preferred embodiment of this inventive concept.

Briefly, the invention consists of a fire box having side and end walls hinged to a bottom, and a flanged cover hinged to one side wall, foldable into substantially flat position. Flanges on the ends of the side and end walls are engaged by slotted legs to hold the assembly in operative position, the flange on the cover also overlying the top of the side and end walls. A removable collapsible chimney is provided, as is a removable grill. The grill is adjustable as to height, and a lock is provided for holding the grill in a selected position of adjustment.

In the drawings:

FIGURE 1 is a perspective view of one form of collapsible stove embodying the instant invention shown in assembled, ready-for-use position;

FIGURE 2 is a perspective view showing the stove with the lid open and supported by the chimney, to be used as a serving tray;

FIGURE 3 is an enlarged sectional view taken substantially along the line 3—3 of FIGURE 1 as viewed in the direction indicated by the arrows;

FIGURE 4 is an enlarged perspective view of one of the legs of the device in disassembled relation;

FIGURE 5 is an enlarged sectional view taken substantially along the line 5—5 of FIGURE 1 as viewed in the direction indicated by the arrows;

FIGURE 6 is an enlarged sectional view taken substantially along the line 6—6 of FIGURE 1 as viewed in the direction indicated by the arrows;

FIGURE 7 is an enlarged sectional view taken substantially along the line 7—7 of FIGURE 1 as viewed in the direction indicated by the arrows;

FIGURE 8 is an enlarged top plan view of the fire box showing a removable grill in position therein;

FIGURE 9 is a perspective view of one of the assembled grill mounting elements;

FIGURE 10 is a sectional view taken substantially along the line 10—10 of FIGURE 8 as viewed in the direction indicated by the arrows;

FIGURE 11 is an end elevational view of the fire box showing the other grill mounting element in position, and the locking means for the grill;

FIGURE 12 is a sectional view taken substantially along the line 12—12 of FIGURE 8 as viewed in the direction indicated by the arrows;

FIGURE 13 is a sectional view taken substantially along the line 13—13 of FIGURE 8 as viewed in the direction indicated by the arrows;

FIGURE 14 is an enlarged perspective view of a constructional detail;

FIGURE 15 is an enlarged sectional view taken substantially along the line 15—15 of FIGURE 13 as viewed in the direction indicated by the arrows;

Similar reference characters refer to similar parts throughout the several views of the drawings.

Figure 16:
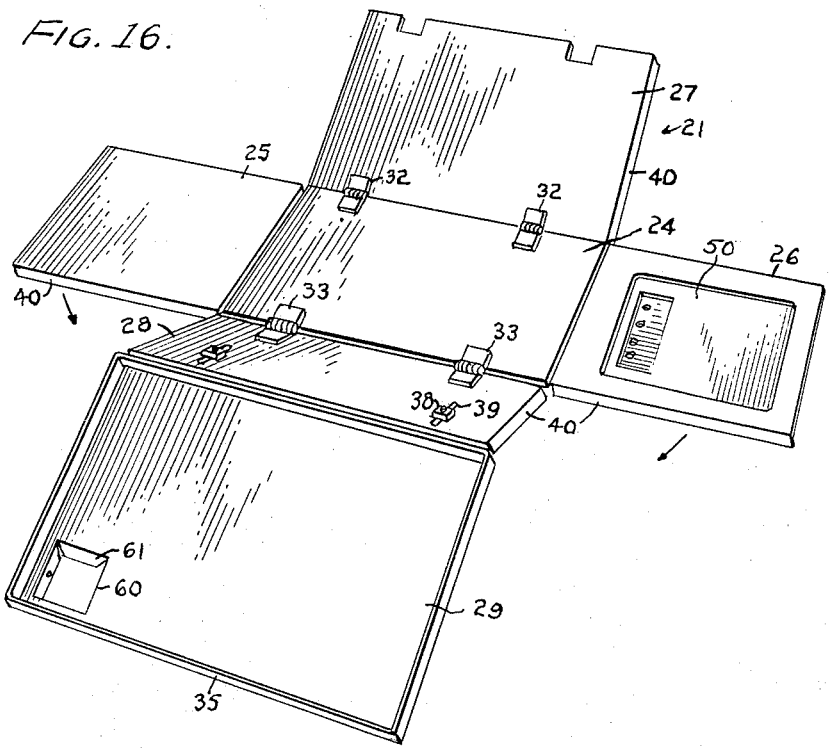
FIGURE 16 is a perspective view of the fire box in partially disassembled relation prior to folding.

Having reference now to the drawings in detail, the stove of the instant invention is generally indicated at 20 in FIGURE 1 and consists of a fire box generally indicated at 21 supported by a plurality of legs 22 and having a chimney generally indicated at 23.

The fire box consists of a bottom plate 24, a rear wall 25, a front wall 26, a first side wall 27, a second side wall 28 and a top 29. Rear and front walls 25 and 26 are hinged to bottom 24 by externally mounted leaf hinges 30 and 31 respectively, as best shown in FIGURES 1 and 12, and when the device is in folded position, fold inwardly over bottom plate 24. Side walls 27 and 28 are similarly hinged by means of hinges 32 and 33, the latter however being positioned on the inner sides of the bottom and side walls so that the side walls may fold over the bottom walls. Top 29 is provided with a peripheral flange 35 which, when the device is in assembled relation, overlies the tops of the front, rear and side walls to secure the components in assembled relation. Top 29 is hinged to the top of side wall 28 by external hinges 36, the lower leaf 37 of which is slidably secured by a bolt 38 in slots 39 adjacent the upper edge of side wall 28 to permit the settling of the lid or cover on the top of the device to permit the flanges to surround the upper portions of the side and end walls.

Each side wall 27 and 28, as well as front and rear walls 25 and 26, is provided with a relatively short outwardly extending flange 40 as best shown in FIGURE 5, the juxtaposed flanges at each corner of the fire box being engageable in a slot 41 in each leg 22 so that the legs, in addition to supporting the device, serve to hold the parts in related assembly. The upper ends of each slot 41 are tapered as at 42 to facilitate engagement of the flanges therein. It is to be noted that flanges 40 terminate slightly below the top of the device to permit peripheral flange 35 to seat over the top edges of the side and end walls.

Each leg 22 is provided with a foot plate 43 which may be firmly affixed to the bottom of the leg, or which may be, as shown in FIGURE 4a, adjustable. FIGURE 4a discloses a modification wherein each leg 22a is provided at its lower extremity with a nut 45 which engages a threaded stem 46 terminating in a socket 47. The socket 47 contains a ball 48 which is affixed to a foot plate 49, the arrangement being such that the foot plate may swivel in the ball joint provided by components 47 and 48, to compensate for rough or uneven ground. The threaded stem 46 permits minor adjustment in the length of each leg to accommodate inequalities in the terrain.

Front wall 26 is provided with an access door 50 hinged as at 51 and provided with a latch 52 engaging a keeper 53. A conventional sliding damper 54 is provided in the lower portion of door 50.

Figure 17:
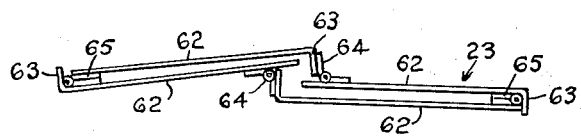
FIGURE 17 is an enlarged end elevational view of the chimney construction in folded position.

Cover or lid 29 is provided adjacent a rear corner thereof with a rectangular opening 60 surrounded by relatively short upstanding flanges 61 upon which is mounted chimney 23. Chimney 23 consists of four side plates 62, each of which is provided adjacent one side edge with a relatively short right-angled flange 63. Hinges 64 are provided on the outer sides of two diagonally opposite flanges 63, while similar hinges 65 are provided on the inner sides of the other two diagonally opposite flanges 63. As shown in FIGURE 6, when the device is assembled, the flanges 63 limit the movement of the side plates 62 to a substantially right-angled configuration. However, the alternate inside and outside mounting of the hinges 64 and 65 permit the chimney to be folded to substantially flat position as best shown in FIGURE 17, the direction of the arrows in FIGURE 6 being indicative of the direction of folding of the side plates 62 relative to each other. Means are provided, as best shown in FIGURE 7, for releasably securing chimney 23 in position on the top of stove cover 29. Two opposite flanges 61 are provided with openings 70 for the reception of pins 71, which in turn project through openings in the lower portions of a pair of opposite chimney side plates 62. The pins are carried by bosses 72 on the inner sides of spring fingers 73 which are secured in any desired manner, as by welding, at one end 74 to the adjacent side plate 62. The arrangement is thus such that the chimney is firmly secured in position by the spring handle 73 until the pins are released from the registering openings, at which time the chimney may be removed and folded as previously described. When a grill, to be more fully described hereinafter, is employed interiorly of the body 21, lid or cover 29 is folded to the position shown in FIGURE 2, the chimney 23 being of a length to support cover 29 in substantially horizontal position as shown.

The chimney 23 is preferably placed in a corner of top 29 remote from the hinges thereof, thus providing a relatively large area for the placement of utensils, either on the top when the device is used as a stove, or on the interior thereof when the device is used as a grill. Additionally, the surface towards the rear and adjacent the chimney is somewhat cooler than the forward area of the stove, and may be used as a warming area. By placing the chimney to one side, larger utensils may be accommodated than in the rear center position.

A grill, generally indicated at 80, is provided for use with the stove of the instant invention when the cover 29 is in the open position of FIGURE 2. The grill consists of a pair of spaced rods 81 between which extend grill bars 82 of conventional form. A collar 83 is fixed to each rod 81 adjacent the end thereof, and has connected thereto a chain 84. The chains 84 are in turn connected at a midpoint to a common chain 85, the upper end of each chain 85 being in turn connected to a rod 86 having a crank 87 at one end. Rotation of the rod 86 will wind the chains 85 thereabout, thus varying the height of the grill with respect to the fire box.

Means are provided for supporting the grill on the fire box, and consist of a rear plate 88 as shown in FIGURE 9, having a central raised portion 90 with an opening 91 therein into which is inserted one end of supporting rod 86, and a pair of offset tongues 89 which engage over rear wall 25, as seen in FIGURE 8 and 12. A similar support 92 having similar offset tongues 93 is mounted on front wall 26, and is also provided with a raised portion 94 having a notch 95 therein aligned with opening 91 for the accommodation of the other end of rod 86. A spring locking member 97 is secured to plate 92 and has a notch 98 therein which is normally aligned with notch 95. A bolt 99 having a wing nut 100 thereon extends through suitable aligned apertures in plate 92 and tongue 97. Tightening of the wing nut 100 disaligns notch 98 with notch 95, effectively to clamp rod 86 against turning movement, thus holding the grill in a selected position of adjustment. The inner side of plate 92 has secured thereto a plate 102 from which depends a channel-shaped member 103. A U-shaped guide 104, see FIGURE 14, has one end 105 thereof secured to the underside of adjacent rod 81, while the other portion 106 extends into the channel-shaped member 103 to preclude dipping of the grill when the latter is suspended over the fire in the fire box.

Figure 18:
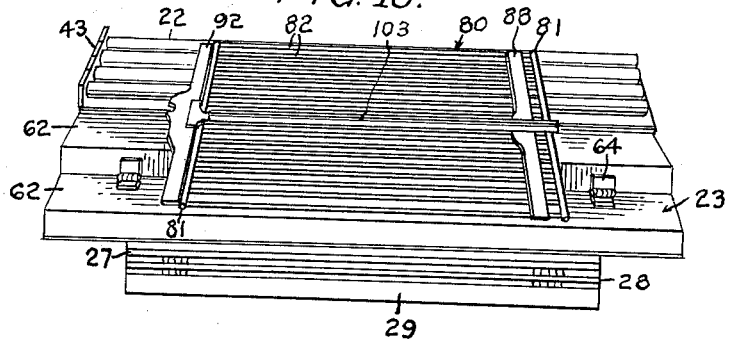
FIGURE 18 is a perspective view of the entire stove assembly in folded position ready for storage or transportation.

FIGURE 18 shows the components in disassembled relation, with the folded fire box including the ends 25 and 26 folded into relatively flat relation, with the sides 27 and 28 folded thereover. The chimney 23 in the folded condition of FIGURE 7 is placed on top of this assembly with the legs 22 alongside thereof, and the grill 80, together with its end plates 88 and 92, positioned thereover. The arrangement is a relatively flat, compact assembly which may be readily strapped or tied in position, or which may be enclosed in a case or wrapped in a sheet of material or the like, as desired.

From the foregoing it will now be seen that there is herein provided an improved folding stove which is adaptable either to a flat cooking surface or the use of a grill, which may be assembled and disassembled with a minimum of effort and difficulty, and which accomplishes all of the objects of this invention and others, including many advantages of great practical utility and commercial importance.

I claim:
1. A collapsible camp stove comprising in combination
 a fire box of generally rectangular configuration having
  a base plate,
  side walls hinged to said base plate and foldable thereover to substantially flat position,
  front and rear walls hinged to said base plate and foldable thereover to substantially flat position,
  a top cover hinged to one of said walls and foldable thereagainst,
  means on said cover for holding said walls in substantially rectangular position when the fire box is assembled, said means comprising
  supporting legs detachably secured to said fire box,
  a depending peripheral flange engageable about the outside of the tops of said walls when the fire box is assembled,
  each wall being provided along its edges with an angularly disposed flange,
  the flanges of adjacent edges abutting at an acute angle,
  and each leg being provided with an elongated slot open at its upper end,
  the abutting flanges of adjacent edges fitting in said slot whereby said legs serve as additional means for holding said sides in assembled relation.

2. The structure of claim 1 wherein the flanges in each wall terminate below the top thereof whereby the flange on said cover seats on the tops of said flanges on said walls.

3. The structure of claim 1 wherein the slot in each leg is beveled at its open end to facilitate the insertion of said adjacent flanges therein.

4. The structure of claim 1 wherein each leg is provided with a foot plate.

5. The structure of claim 4 wherein each foot plate is universally mounted.

6. The structure of claim 5 wherein each foot plate is mounted on a threaded stem and each leg has a nut therein engaging said stem permitting minor variation in the length of each leg.

7. The structure of claim 1 wherein
said side walls are hinged on one side of said base plate and
said front and rear walls are hinged on the opposite side of said base plate
whereby said side walls fold against one side of said base plate and said front and rear walls on the opposite side thereof.

8. The structure of claim 1 wherein said front wall is provided with a hinged access door.

9. The structure of claim 10 wherein a sliding damper is provided in said access door.

10. The structure of claim 1 wherein
the wall to which said cover is hinged is provided with vertical slots, and
bolts extended through said slots carry the hinges for said cover,
whereby said cover may move downwardly so that the flange thereon overlies the top of said walls.

11. The structure of claim 1 wherein
an opening is provided in said cover, and
a chimney is detachably mounted over said opening.

12. The structure of claim 11 wherein said chimney is of a length to support said cover in substantially horizontal position when said cover is folded back to open the top of said fire box.

13. The structure of claim 12 wherein said chimney is foldable to flat position.

14. The structure of claim 12 wherein said chimney comprises
four substantially rectangular plates,
each having a substantially right-angled flange along one edge thereof, and
hinges connect adjacent plates,
said flanges limiting the expansion of said hinges to hold said plates in rectangular condition when opened for use.

15. The structure of claim 14 wherein the hinges on two diagonally opposed corners of said chimney are on the inside thereof and the hinges on the other two diagonally opposed corners are on the outside
to facilitate folding the chimney to relatively flat condition.

16. The structure of claim 12 wherein
said opening in said cover in substantially rectangular and
upstanding flanges are provided on each side,
said chimney fitting over said flanges.

17. The structure of claim 16 wherein lock means are provided for securing said chimney to said flanges.

18. The structure of claim 17 wherein said lock means includes
spring fingers extending outwardly from two opposite sides of said chimney,
a pin extending inwardly from each finger and
registering openings in the adjacent side plates and flanges through which said pins are extended.

19. The structure of claim 1 wherein
notched grill supports are detachably mounted on said front and rear walls,
a grill supporting rod is seated in the notches of said supports, and
a grill is suspended from said rod.

20. The structure of claim 19 wherein
said grill is suspended by chains from said rod, and
said rod is provided with a handle for rotating said rod to vary the effective height of said grill over a fire in said fire box.

21. The structure of claim 20 wherein locking means are provided for securing said rod against rotation.

22. The structure of claim 21 wherein said locking means comprise
a spring finger having a notch therein secured to one of said grill supports,
a bolt extends through said finger,
a wing nut on said bolt is rotated to move said spring finger towards its associated support,
the notch in said finger being normally aligned with the notch in its associated support, and movement of said finger towards the support disaligning the notches to clamp the grill rod against rotation.

23. The structure of claim 21 wherein
a lug is carried by said grill and
a channel depends from one of said grill supports,
said lug slidably engaging in said channel to prevent tilting of said grill.

References Cited

UNITED STATES PATENTS

| | | | |
|---|---|---|---|
| 497,275 | 5/1893 | Glasmann | 126—9 |
| 2,424,665 | 7/1947 | Pope | 126—9 |
| 2,485,667 | 10/1949 | Sims | 126—9 |
| 3,393,670 | 7/1968 | Psarris | 126—9 X |

EDWARD G. FAVORS, Primary Examiner